US012480337B2

(12) United States Patent
Su et al.

(10) Patent No.: US 12,480,337 B2
(45) Date of Patent: Nov. 25, 2025

(54) ELECTRIC LOCK BODY

(71) Applicant: Shenzhen Kaadas Intelligent Technology Co., Ltd., Guangdong (CN)

(72) Inventors: Qiyun Su, Guangdong (CN); Zhongxiang Liang, Guangdong (CN)

(73) Assignee: SHENZHEN KAADAS INTELLIGENT TECHNOLOGY CO., LTD., Guangdong (CN)

( * ) Notice: Subject to any disclaimer, the term of this patent is extended or adjusted under 35 U.S.C. 154(b) by 301 days.

(21) Appl. No.: 18/209,179

(22) Filed: Jun. 13, 2023

(65) Prior Publication Data

US 2023/0323703 A1 Oct. 12, 2023

Related U.S. Application Data

(63) Continuation of application No. PCT/CN2021/114815, filed on Aug. 26, 2021.

(30) Foreign Application Priority Data

Dec. 14, 2020 (CN) ......................... 202011479199.2
Dec. 14, 2020 (CN) ......................... 202023003261.9

(51) Int. Cl.
*E05B 47/00* (2006.01)

(52) U.S. Cl.
CPC .. *E05B 47/0012* (2013.01); *E05B 2047/0017* (2013.01); *E05B 2047/0022* (2013.01); *E05B 2047/0036* (2013.01)

(58) Field of Classification Search
CPC ..... E05B 2047/0017; E05B 2047/0018; E05B 2047/002; E05B 2047/0022;
(Continued)

(56) References Cited

U.S. PATENT DOCUMENTS 5,359,884 A * 11/1994 Fey ........................ B62M 25/08 73/115.01
9,326,094 B2 * 4/2016 Johnson ................ E05B 47/026
(Continued)

FOREIGN PATENT DOCUMENTS

CN 201125584 Y 10/2008
CN 101597979 A 12/2009
(Continued)

OTHER PUBLICATIONS

Chinese First Office Action dated Apr. 25, 2023 issued in corresponding CN Application No. 202011479199.2.
(Continued)

*Primary Examiner* — Christine M Mills
*Assistant Examiner* — Faria F Ahmad
(74) *Attorney, Agent, or Firm* — Scully, Scott, Murphy & Presser, P.C.

(57) ABSTRACT

An electric lock body is provided. The electric lock body includes a housing, a driving mechanism, and a bolt. The driving mechanism includes a motor, a planetary gear assembly, and a cage. The planetary gear assembly includes a ring gear, a planet gear, and a sun gear. The motor is rotatably connected to the sun gear. The planet gear is rotatably connected between the sun gear and the ring gear. The cage is disposed at one side of the planetary gear assembly. The ring gear and the sun gear each abut against the cage. The planet gear is connected to the cage. The bolt is connected to the cage. When the cage rotates, the bolt is driven by the cage to move, to make the bolt switch between an unlocked state where the bolt is accommodated in the housing and a locked state where the bolt extends beyond the housing.

8 Claims, 7 Drawing Sheets

(58) Field of Classification Search
CPC ..... E05B 2047/0036; E05B 2047/0084; E05B 47/0012; E05B 47/02; E05B 47/023
See application file for complete search history.

(56) References Cited

U.S. PATENT DOCUMENTS

| | | | | |
|---|---|---|---|---|
| 9,546,504 | B2 * | 1/2017 | Overgaard | E05B 63/0056 |
| 11,761,241 | B2 * | 9/2023 | Zhou | E05B 11/00 70/278.7 |
| 12,258,789 | B2 * | 3/2025 | Su | E05B 47/0012 |
| 2015/0040695 | A1 * | 2/2015 | Narovlansky | E05B 17/042 74/49 |
| 2017/0037937 | A1 * | 2/2017 | Ku | E05B 47/0046 |
| 2017/0226775 | A1 * | 8/2017 | Hermann | E05B 65/10 |
| 2018/0320413 | A1 | 11/2018 | Wong | |
| 2018/0323632 | A1 * | 11/2018 | Astarabadi | E05B 47/0012 |
| 2022/0307291 | A1 * | 9/2022 | Chang | F16H 35/10 |
| 2023/0243185 | A1 * | 8/2023 | Su | E05B 47/0012 70/277 |

FOREIGN PATENT DOCUMENTS

| | | | | |
|---|---|---|---|---|
| CN | 203499380 | U | 3/2014 | |
| CN | 203559654 | U | 4/2014 | |
| CN | 203626428 | U | 6/2014 | |
| CN | 110273590 | A | 9/2019 | |
| CN | 110439376 | A | 11/2019 | |
| CN | 110847713 | A | 2/2020 | |
| CN | 111648676 | A | 9/2020 | |
| CN | 116905904 | A * | 10/2023 | E05B 15/00 |
| CN | 117345049 | A * | 1/2024 | |
| EP | 1074681 | A1 * | 2/2001 | E05B 81/14 |
| FR | 2849084 | A1 | 6/2004 | |
| KR | 200428317 | Y1 | 10/2006 | |

OTHER PUBLICATIONS

International Search Report dated Nov. 25, 2021, issued in PCT/CN2021/114815.

* cited by examiner

ELECTRIC LOCK BODY

CROSS-REFERENCE TO RELATED APPLICATIONS

This application is a continuation of International Application No. PCT/CN2021/114815, filed Aug. 26, 2021, which claims priority to Chinese Patent Application No. 202023003261.9, filed Dec. 14, 2020, and Chinese Patent Application No. 202011479199.2, filed Dec. 14, 2020, the entire disclosures of which are hereby incorporated by reference.

TECHNICAL FIELD

This disclosure relates to the field of door-lock structure technology, and in particular to an electric lock body.

BACKGROUND

With increasing number of populations, the number of houses also continues to increase. Door locks are one of important structures that control opening or closing of the houses. Therefore, expectations and requirements of people for the door locks are higher and higher. At present, the door lock usually adopts a motor lock, that is, a motor drives a cylinder plug to rotate to open or close a door. However, once the motor of the motor lock or a driving mechanism of the motor lock fails, the whole motor lock is unable to move, and a user is unable to open the door from the inside of the house, thereby greatly increasing a difficulty and a risk of opening the door.

SUMMARY

An electric lock body is provided in the present disclosure. The electric lock body includes a housing, a driving mechanism, and a bolt. The housing defines an accommodating space. The driving mechanism is disposed in the accommodating space. The driving mechanism includes a motor, a planetary gear assembly, and a cage. The planetary gear assembly includes a ring gear, a planet gear, and a sun gear. The motor is rotatably connected to the sun gear. The ring gear defines a receiving space. The planet gear and part of the sun gear each are disposed in the receiving space, and the planet gear is rotatably connected between the sun gear and the ring gear. The cage is disposed at one side of the planetary gear assembly. The ring gear and the sun gear each abut against the cage. The planet gear is connected to the cage. When the ring gear is in a fixed state, the sun gear is driven by the motor to rotate, to make the planet gear rotate relative to the ring gear to make the cage rotate; or when the sun gear is in the fixed state, the ring gear is controlled to rotate to make the planet gear rotate relative to the sun gear to make the cage rotate. At least part of the bolt is disposed in the accommodating space. The bolt is connected to the cage. When the cage rotates, the bolt is driven by the cage to move, to make the bolt switch between an unlocked state where the bolt is accommodated in the housing and a locked state where the bolt extends beyond the housing.

BRIEF DESCRIPTION OF THE DRAWINGS

To describe technical solutions in implementations of the present disclosure more clearly, the following will describe accompanying drawings required for describing the implementations of the present disclosure.

Figure 1:
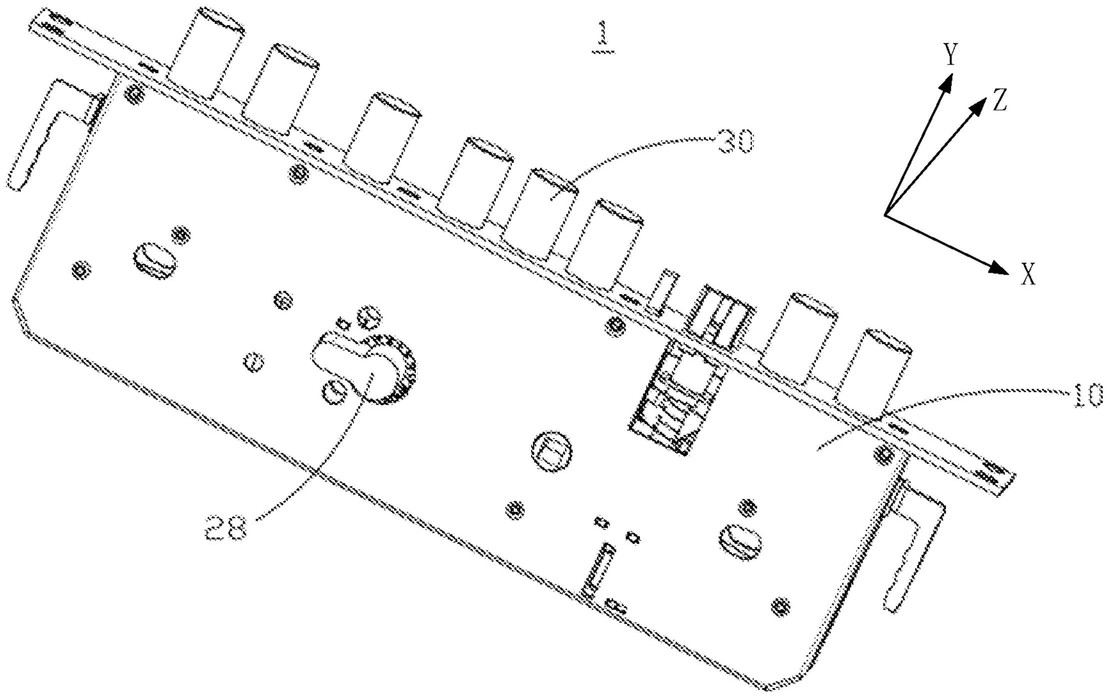
FIG. 1 is a schematic perspective structural view of an electric lock body in an implementation of the present disclosure.

REFERENCE SIGNS electric lock body—1, housing—10, accommodating space—11, through hole—12, driving mechanism—20, motor—21, planetary gear assembly—22, ring gear—23, planet gear—24, sun gear—25, cage—26, protective case—27, buffer member—270, first protrusion—271, control mechanism—28, gear assembly—29, first gear—291, second gear—292, third gear—293, worm wheel—294, worm—295, bolt—30, transmission mechanism—40, output gear—41, rack—42, bolt plate—43, connecting member—44, second protrusion—442, buffer member—45, positioning mechanism—50, fixing member—51, first through-hole—511, second through-hole—512, first connecting rod—521, push rod—522, first elastic member—523, third through-hole—524, second connecting rod—531, latch bolt—532, second elastic member—533, latch-bolt hook—54, first part—541, second part—542, first positioning portion—543, second positioning portion—544, third elastic member—55, heaven-and-earth lock mechanism—60, heaven-and-earth lock—61, third part—62, fourth part—63, fourth elastic member—64, guide mechanism—70.

DETAILED DESCRIPTION

The following are preferred implementations of the present disclosure. It should be noted that those of ordinary skill in the art may further make improvements and modifications without departing from the principle of the present disclosure, and these improvements and modifications are also considered to be within protection of the present disclosure.

Before the technical solutions of the present disclosure are introduced, technical problems in the related art are further introduced in detail below.

A door lock is one of important structural components on a door, and can control the door to open or close a room, a space, etc. An electric lock body is one of the important structural components on the door lock. In the related art, a purely mechanical door lock structure is usually adopted, that is, a key is utilized to drive a structure in the door lock to move to open or close the door. With development of science and technology and changing requirements of users, electronic locks have appeared in visual fields of people and have attracted attention of the users. An electronic lock normally does not require a key, and can automatically drive the structure in the door lock through a built-in circuit to open or close the door only by means of methods such as face recognition, password input, fingerprint input, voice recognition, etc. This brings great convenience and user experience. However, once a motor, a circuit structure, or other structural components in a motor lock fail, resulting in a problem occurs in a certain component in the motor lock, the motor lock will be unable to operate normally, and a user outside the door will be unable to open the door to enter the room by a method of unlocking the door with an electronic lock, and can only enter the room only by a method of unlocking the door with a key. In addition, a user at the inner side of the door will be unable to open the door to walk out of the room, and in this case, the door or the door lock can only be violently disassembled, thereby causing irreversible damage to the door and greatly increasing a difficulty and a risk of unlocking.

In view of this, an electric lock body is provided in the present disclosure. The electric lock body includes a housing, a driving mechanism, and a bolt. The housing defines an accommodating space. The driving mechanism is disposed in the accommodating space. The driving mechanism includes a motor, a planetary gear assembly, and a cage. The planetary gear assembly includes a ring gear, a planet gear, and a sun gear. The motor is rotatably connected to the sun gear. The ring gear defines a receiving space. The planet gear and part of the sun gear each are disposed in the receiving space, and the planet gear is rotatably connected between the sun gear and the ring gear. The cage is disposed at one side of the planetary gear assembly. The ring gear and the sun gear each abut against the cage. The planet gear is connected to the cage. When the ring gear is in a fixed state, the sun gear is driven by the motor to rotate, to make the planet gear rotate relative to the ring gear to make the cage rotate; or when the sun gear is in the fixed state, the ring gear is controlled to rotate to make the planet gear rotate relative to the sun gear to make the cage rotate. At least part of the bolt is disposed in the accommodating space. The bolt is connected to the cage. When the cage rotates, the bolt is driven by the cage to move, to make the bolt switch between an unlocked state where the bolt is accommodated in the housing and a locked state where the bolt extends beyond the housing.

In the electric lock body provided in the present disclosure, firstly, the planetary gear assembly is disposed, such that the motor is rotatably connected to the sun gear, that is, the motor can control rotation of the sun gear. Secondly, the planet gear is connected to the cage, that is, the planet gear can control rotation of the cage. Thirdly, the bolt is connected to the cage, that is, the cage can control movement of the cage. In addition, in the present disclosure, the planet gear can be rotated by mutual cooperation of the ring gear, the planet gear, and the sun gear, then the cage is driven to rotate, and finally the bolt connected to the cage is driven to move, such that the bolt switches between the unlocked state where the bolt is accommodated in the housing and the locked state where the bolt extend beyond the housing.

A specific cooperation method of the ring gear, the planet gear, and the sun gear may be understood as that, when the ring gear is in the fixed state, the sun gear may be driven by the motor to rotate, such that the planet gear rotates relative to the ring gear, and a door can be opened or closed by the motor. When the sun gear is unable to rotate due to a fault of the motor, and the sun gear is in the fixed state, the ring gear can be controlled to rotate, such that the planet gear rotates relative to the sun gear. In this way, even when the motor fails, the door can still be opened or closed by controlling the ring gear to rotate.

In summary, in the driving mechanism provided in the present disclosure, the door can be opened or closed by adopting the motor to control the sun gear to rotate or by controlling the ring gear to rotate, such that a method for controlling the door lock is added, a problem that the door is unable to be opened or closed due to motor damage in a single motor lock is avoided, and a difficulty and a risk of opening the door is reduced.

In implementations, the electric lock body further includes a transmission mechanism. The transmission mechanism has one end connected to the cage, and another end connected to the bolt. When the cage rotates, the bolt driven by the cage through the transmission mechanism to move.

In implementations, the transmission mechanism includes an output gear, a rack, and a bolt plate. The output gear is connected to the cage. The output gear engages with the rack. The rack is connected to the bolt plate. The bolt plate is connected to the bolt.

In implementations, the planet gear is connected to the cage at one side of the cage. The cage defines a buffer groove at another side of the cage. First protrusions protrude from a sidewall of the buffer groove defined in the cage. The transmission mechanism further includes a connecting member. The output gear is disposed on the connecting member. The connecting member is provided with second protrusions at a periphery of the connecting member. At least part of each of the second protrusions is disposed in the buffer groove. Each of the second protrusions is disposed between two adjacent first protrusions. The electric lock body further includes buffer members. The buffer members are disposed in the buffer groove. The buffer members each abut between one first protrusion and one second protrusion adjacent to the first protrusion.

In implementations, the electric lock body further includes a positioning mechanism. At least part of the positioning mechanism is disposed in the accommodating space. The positioning mechanism is connected to the bolt plate. The positioning mechanism is driven to move when the bolt plate moves. The electric lock body further has a positioned state. When the electric lock body is in the positioned state and the locked state, part of the positioning mechanism extends beyond the housing. When the electric lock body is in the unlocked state, the positioning mechanism is accommodated in the accommodating space.

In implementations, the positioning mechanism includes a fixing member, a first connecting rod, a push rod, a first elastic member, a second connecting rod, a latch bolt, a second elastic member, and a latch-bolt hook. The fixing member defines a first through-hole and a second through-hole that is spaced apart from the first through-hole. The first connecting rod has one end penetrating through the first through-hole, and another end connected to the push rod. The first connecting rod defines a third through-hole. At least part of the push rod is disposed in the accommodating space. The first elastic member is connected to the push rod and the fixing member. The second connecting rod has one end penetrating through the second through-hole, and another end connected to the latch bolt. At least part of the latch bolt is disposed in the accommodating space. The second elastic member is connected to the latch bolt and the fixing member. The latch-bolt hook is rotatably connected to the bolt plate. The latch-bolt hook has a first part and a second part connected to the first part. The first part is disposed in the third through-hole. The first part is configured to cooperate with the first connecting rod to control the push rod to move. The second part is provided with a first positioning portion at one end of the second part close to the latch bolt. The latch bolt is provided with a second positioning portion at an outer peripheral sidewall of the latch bolt close to the second connecting rod. The first positioning portion is configured to cooperate with the second positioning portion to control the latch bolt to move.

In implementations, the positioning mechanism further includes a third elastic member. The third elastic member is connected to the bolt plate and the latch-bolt hook.

In implementations, when the electric lock body switches from the positioned state to the locked state, part of the push rod and part of the latch bolt each extend beyond the housing, and the driving mechanism is configured to drive the bolt plate to drive the latch bolt to move to make part of the bolt extend beyond the housing. When the electric lock body switches from the locked state to the unlocked state, the drive mechanism is configured to drive the bolt plate to drive the bolt to move, to make the bolt be accommodated in the accommodating space. During movement of the bolt plate, the first positioning portion abuts against the second positioning portion and drives the latch bolt to move, to make the latch bolt be accommodated in the accommodating space and the second elastic member be in a compressed state. During the movement of the bolt plate, the first part abuts against the first connecting rod at a sidewall of the third through-hole defined in the first connecting rod and drives the push rod to move, to make the push rod be accommodated in the accommodating space and the first elastic member be in the compressed state. When the electric lock body switches from the unlocked state to the positioned state, the push rod and the first connecting rod are driven by the first elastic member to move, to make part of the push rod extend beyond the housing. During movement of the first connecting rod, the first connecting rod abuts against the first part at the sidewall of the third through-hole defined in the first connecting rod, and drives the latch-bolt hook to rotate relative to the bolt plate, to make the first positioning portion be separated from the second positioning portion, make the latch bolt and the second connecting rod be driven by the second elastic member to move, and further make part of the latch bolt extend beyond the housing.

In implementations, the electric lock body further includes a heaven-and-earth lock mechanism. At least part of the heaven-and-earth lock mechanism is disposed in the accommodating space. The heaven-and-earth lock mechanism includes a heaven-and-earth lock, a third part, a fourth part, and a fourth elastic member. The heaven-and-earth lock is slidably connected to the housing. One end of the third portion and one end of the fourth portion each are rotatably connected to the housing. Another end of the third part is slidably connected to the bolt plate. Another end of the fourth part is slidably connected to the heaven-and-earth lock. The fourth elastic member is connected to the third part and the fourth part.

In implementations, the electric lock body further includes a guide mechanism disposed in the accommodating space. The guide mechanism is rotatably connected to the housing. The guide mechanism is configured to cooperate with the bolt plate to make the bolt plate move in a preset direction.

Figure 2:
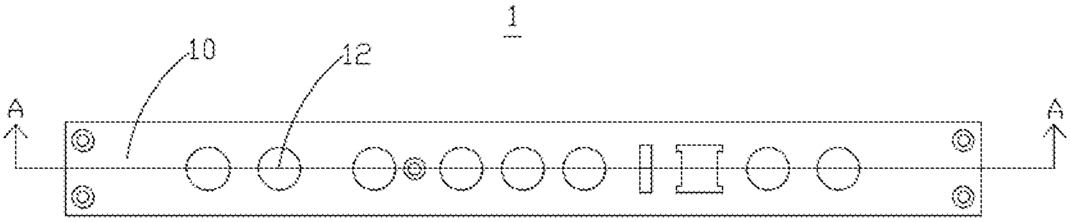
FIG. 2 is a top view of FIG. 1.
Figure 3:
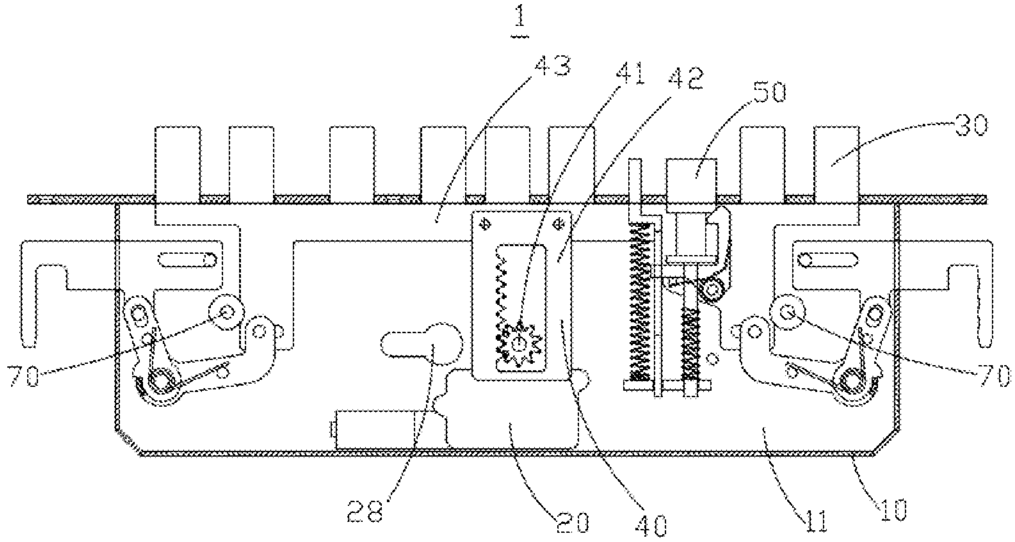
FIG. 3 is a schematic cross-sectional view taken along direction A-A in FIG. 2 in an implementation of the present disclosure.
Figure 4:
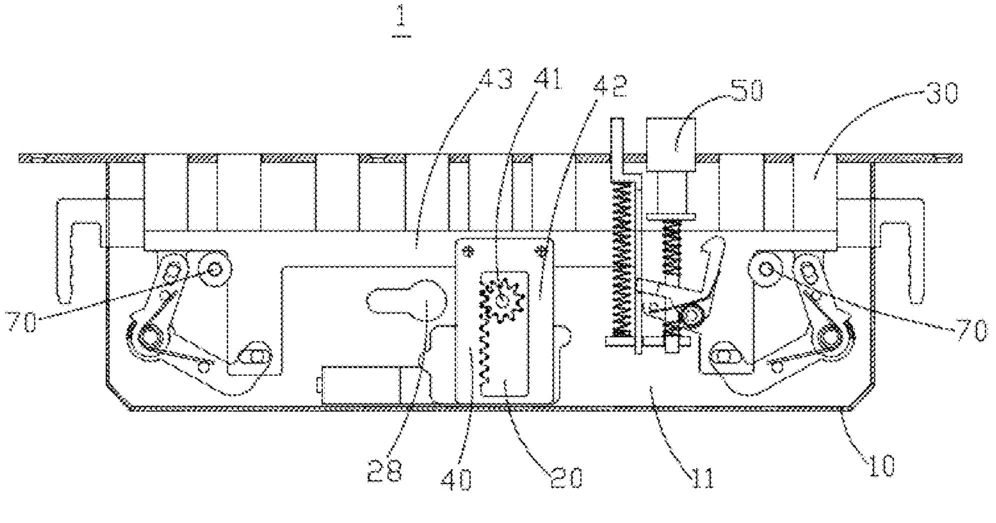
FIG. 4 is a schematic cross-sectional view taken along direction A-A in another implementation of the present disclosure.
Figure 5:
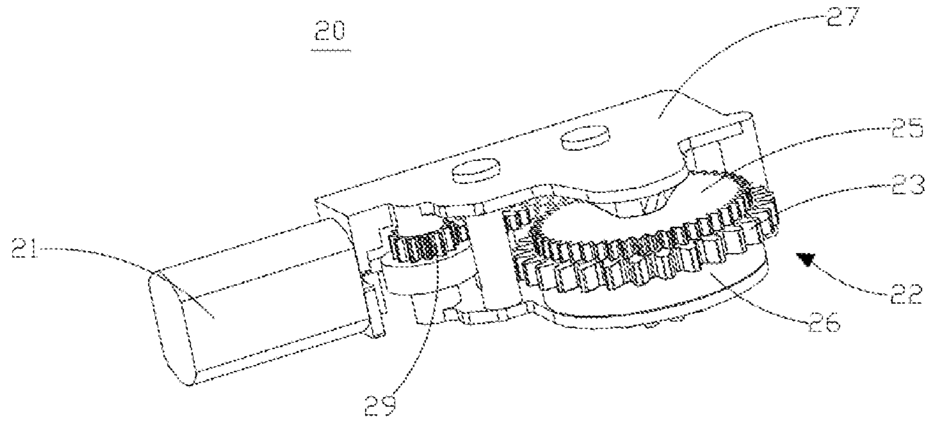
FIG. 5 is a schematic perspective structural view of a driving mechanism in an implementation of the present disclosure.
Figure 6:
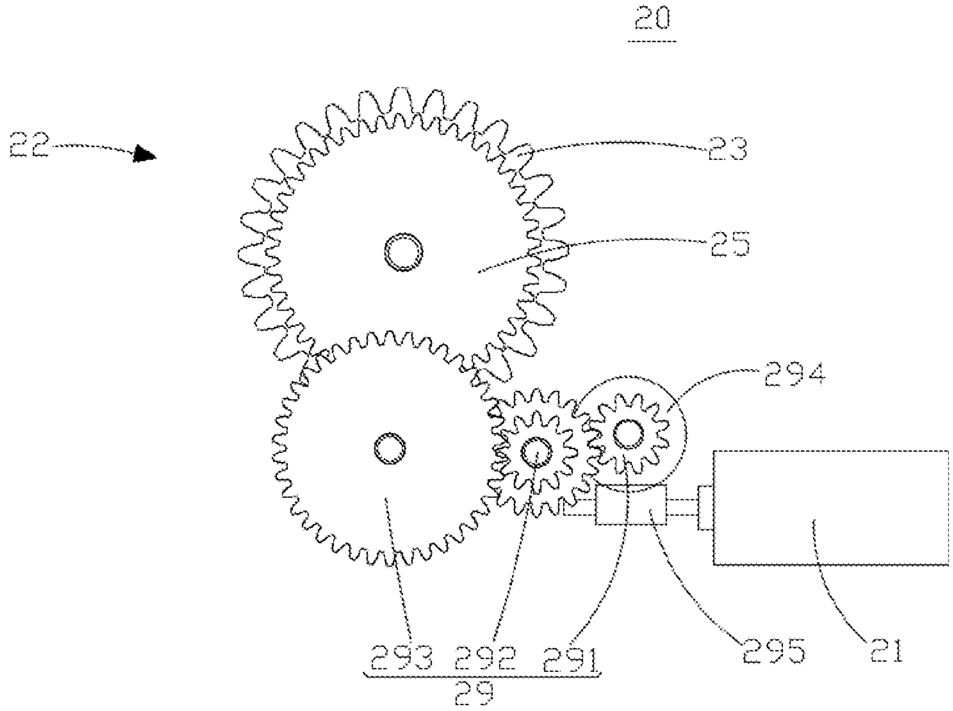
FIG. 6 is a top view of part of a driving mechanism in an implementation of the present disclosure.
Figure 7:
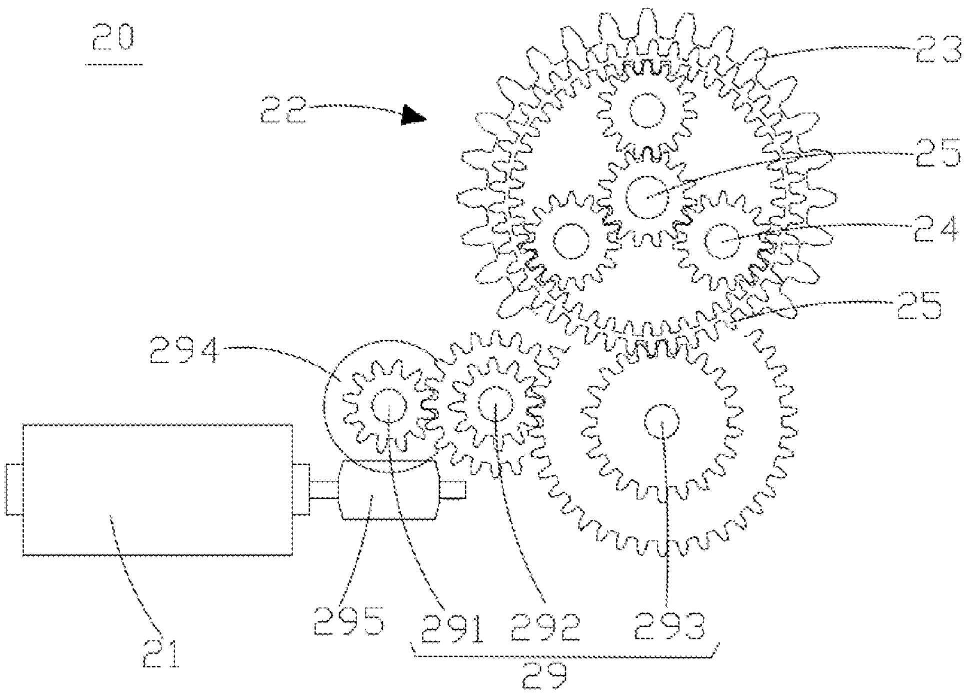
FIG. 7 is a top view of part of a driving mechanism in another implementation of the present disclosure.

In view of this, to solve the above problems, an electric block body is provided in the present disclosure. Referring to FIGS. 1 to 7 together, FIG. 1 is a schematic perspective structural view of an electric lock body in an implementation of the present disclosure, FIG. 2 is a top view of FIG. 1, FIG. 3 is a schematic cross-sectional view taken along direction A-A in FIG. 2 in an implementation of the present disclosure, FIG. 4 is a schematic cross-sectional view taken along direction A-A in another implementation of the present disclosure, FIG. 5 is a schematic perspective structural view of a driving mechanism in an implementation of the present disclosure, FIG. 6 is a top view of part of a driving mechanism in an implementation of the present disclosure, and FIG. 7 is a top view of part of a driving mechanism in another implementation of the present disclosure. An electric lock body 1 is provided in this implementation. The electric lock body 1 includes a housing 10, a driving mechanism 20, and a bolt 30. The housing 10 defines an accommodating space 11. The driving mechanism 20 is disposed in the housing 10. The driving mechanism 20 includes a motor 21, a planetary gear assembly 22, and a cage 26. The planetary gear assembly 22 includes a ring gear 23, a planet gear 24, and a sun gear 25. The motor 21 is rotatably connected to the sun gear 25. The ring gear 23 defines a receiving space. The planet gear 24 and part of the sun gear 25 each are disposed in the receiving space, and the planet gear 24 is rotatably connected between the sun gear 25 and the ring gear 23. The cage 26 is disposed at one side of the primary planetary gear assembly 22. The ring gear 23 and the sun cage 25 each abut against the cage 26. The planet gear 24 is connected to the cage 26.

When the ring gear 23 is in a fixed state, the sun gear 25 is driven by the motor 21 to rotate, to make the planet gear 24 rotate relative to the ring gear 23 to make the cage 26 rotate; or when the sun gear 25 is in the fixed state, the ring gear 23 is controlled to rotate to make the planet gear 24 rotate relative to the sun gear 25 to make the cage 26 rotate.

At least part of the bolt 30 is disposed in the accommodating space 11. The bolt 30 is connected to the cage 26. When the cage 26 rotates, the bolt 30 is driven by the cage 26 to move, to make the bolt 30 switch between an unlocked state where the bolt 30 is accommodated in the housing 10 and a locked state where the bolt 30 extends beyond the housing 10.

The housing 10 provided in this implementation is an appearance component of the electric lock body 1, and plays a role of protecting other components of the electric lock body 1 disposed in the housing 10. In addition, the housing 10 may also provide a basis for mounting some components.

The driving mechanism 20 provided in this implementation is one of important structural components of the electric lock body 1. The driving mechanism 20 is a core component for driving the electric lock body 1 to move, that is, movement of the driving mechanism 20 drives other components in the electric lock body 1 to move, and finally a purpose of opening or closing the door is realized.

The bolt 30 provided in this implementation is a direct component that finally realizing unlocking or locking of the electric lock body 1. Specifically, when the bolt 30 extends beyond the housing 10, the bolt 30 may cooperate with a lock hole in a door frame or a wall, such that the door is stuck and the door is unable to be opened, that is, the electric lock body 1 is in a locked state (as illustrated in FIG. 3). When the bolt 30 is accommodated in the housing 10, the bolt 30 is unable to cooperate with the lock hole, that is, the bolt 30 is separated from this component, such that the door is able to be opened, that is, the electric lock body 1 is in an unlocked state (as illustrated in FIG. 4). Optionally, the housing 10 defines a through hole 12 that communicates with the accommodating space 11. Through the through hole 12, the bolt 30 extends beyond or is accommodated in the housing 10. As for how to make the bolt 30 extend beyond the housing 10 or be accommodated in the housing 10, it is driven and controlled by the driving mechanism 20, and detailed structures of the driving mechanism 20 will be introduced in detail next.

The driving mechanism 20 provided in this implementation includes the motor 21. The motor 21 is supplied by a power supply to operate and rotate. Optionally, the power supply may be an external power supply, or be built in the housing 10, such as a battery.

The driving mechanism 20 provided in this implementation further includes the planetary gear assembly 22. The planetary gear assembly 22 includes multiple structural components. For example, the planetary gear assembly 22 includes the ring gear 23, the planet gear 24, and the sun gear 25. Names of three structural components are all technical terms for gears used by those skilled in the art. The ring gear 23 is a circular ring gear, the receiving space is defined in the ring gear 23, and the ring gear 23 has a ring of internal teeth and a ring of external teeth. In addition, the planet gear 24 and the sun gear 25 each have a ring of external teeth, and the planet gear 24 and part of the sun gear 25 each are disposed in the receiving space. It may also be understood that the part of the sun gear 25 is disposed in the receiving space, and the rest of the sun gear 25 is disposed outside the receiving space. As for the motor 21 being rotatably connected to the sun gear 25, it can be understood that the motor 21 is rotatably connected to the rest of the sun gear 25 that is disposed outside the receiving space, and configured to drive the part of the sun gear 25 that is disposed in the receiving space to rotate. Secondly, as for the motor 21 being rotatably connected to the sun gear 25, the motor 21 may be directly connected to the sun gear 25; or another gear assembly 29 is further disposed between the motor 21 and the sun gear 25, one end of the gear assembly 29 is rotatably connected to the motor 21, and the other end of the gear assembly 29 is rotatably connected to the rest of the sun gear 25 that is disposed outside the receiving space. The gear assembly 29 is driven by rotation of the motor 21 to rotate, the rest of the sun gear 25 that is disposed outside the receiving space is driven by rotation of the gear assembly 29 to rotate, and finally the part of the sun gear 25 in the receiving space is driven to rotate. Here, it can be considered that the motor 21 is indirectly rotatably connected to the sun gear 25. As for a specific structure of the gear assembly 29, it will be introduced in the present disclosure later.

Secondly, the planet gear 24 is rotatably connected between the sun gear 25 and the ring gear 23. It may also be understood that one of two opposites end of the planet gear 24 is rotatably connected to the internal teeth of the ring gear 23, and the other of the two opposite ends of the planet gear 24 is rotatably connected to the external teeth of the sun gear 25. The ring gear 23, the planet gear 24, and the sun gear 25 link the entire planetary gear assembly 22 together through the planet gear 24. Optionally, there may be multiple planet gears 24, and the multiple planet gears 24 are arranged at regular intervals. For example, there are three planet gears 24, and the three planet gears 24 are arranged at an interval of 120°. In this way, stability of rotation of the planetary gear assembly 22 and the cage 26.

The driving mechanism 20 provided in this implementation further includes the cage 26. The cage 26 is a support for mounting the planetary gear assembly 22 and other structural components. In addition, the support may also be connected to other components besides the driving mechanism 20, thereby transmitting movement of the cage 26 to other components. For example, the planetary gear assembly 22 is disposed at one side of the cage 26, and the bolt 30 is connected to the cage 26 at the other side of the cage 26. In the planetary gear assembly 25, the ring gear 23 and the sun cage 25 each abut against the cage 26, and the planet gear 24 is connected to the cage 26. Therefore, when the ring gear 23 and the sun gear 25 rotate, movement of the cage 26 is not affected. The planet gear 24 is connected to the cage 26, such that the cage 26 is driven to rotate along with the rotation of the planet gear 24. The bolt 30 can further be driven by rotation of the cage 26 to move.

The above contents relate to a mechanical structure of the driving mechanism 200 provided in this implementation. Specifically, as for how to realize movement of the driving mechanism 200, in this implementation, the ring gear 23, the planet gear 24, and the sun gear 25 cooperate with one another to make the planet gear 24 rotate, and then the cage 26 is driven to rotate, and finally the bolt 30 connected to the cage 26 is driven to move, thereby the door is opened or closed. A specific cooperation method of the ring gear 23, the planet gear 24, and the sun gear 25 may be the following. Any one of the ring gear 23 or the sun gear 25 is fixed, and another of the ring gear 23 and the sun gear 25 rotatably cooperates with the planet gear 24, such that the planet gear 24 can revolve around the sun gear 25, thereby driving the cage 26 to rotate. For example, when the ring gear 23 is in the fixed state, the sun gear 25 is driven by the motor 21 to rotate, such that the planet gear 24 rotates relative to the ring gear 23, then the cage 26 is driven to rotate, and finally the bolt 30 connected to the cage 26 is driven to move, thereby opening or closing the door. When the motor 21 fails and is unable to operate normally, the sun gear 25 is unable to rotate. Here, the sun gear 25 is in the fixed state, and the ring gear 23 can be directly controlled to rotate, such that the planet gear 24 rotates relative to the sun gear 25, thereby driving the cage 26 to rotate. In this way, even when the motor 21 fails, the door can still be opened or closed by controlling the ring gear 23 to rotate.

In addition, in the related art, the electric lock body 1 is mounted in the door, and the driving mechanism 20 is mounted outside the door. However, in this implementation, the driving mechanism 20 is disposed in the accommodating space 11 in the housing 10, that is, the driving mechanism 20 is also disposed in the door, such that a structure outside the door can be simplified and the door as a whole looks more concise. In addition, if the electric block body 1 is damaged, it is only required to replace the electric block body 1 as a whole in the door, which facilitates maintenance and replacement.

Optionally, referring to FIG. 1, FIG. 3, and FIG. 4 again, as for how to fix and rotate the ring gear 23, the electric lock body 1 in this implementation further includes a control mechanism 28, at least part of the control mechanism 28 is disposed in the accommodating space 11, the control mechanism 28 is connected to the ring gear 23, the control mechanism 28 has a fixed state and a rotating state, and the control mechanism 28 is configured to control the ring gear 23 to fix or rotate. In this implementation, the control mechanism 28 may be additionally disposed, such that the control mechanism 28 is connected to the ring gear 23. Since the control mechanism 28 has the fixed state and the rotating state, the ring gear 23 can be fixed when the control mechanism 28 is fixed, and the sun gear 25 is driven by the motor 21 to rotate, such that the planet gear 24 rotates relative to the ring gear 23. When the control mechanism 28 rotates, the ring gear 23 can be rotated, and the sun gear 25 is in the fixed state, such that the planet gear 24 rotates relative to the sun gear 25.

Further optionally, the control mechanism 28 includes, but is not limited to, a cylinder-plug structure, such that fixation or rotation can be realized by cooperation of a key and the cylinder-plug structure. The control mechanism 28 may be other mechanism with a driving function.

Further optionally, the motor 21 and the control mechanism 28 are disposed at the same side of the planet gear 24, such that the structure of the electric lock body 1 can be simplified, thereby reducing the overall size of the electric lock body 1

Optionally, referring to FIG. 6 to FIG. 7 again, the gear assembly 29 includes a first gear 291, a second gear 292, and a third gear 293. The first gear 291 is rotatably connected to the motor 21, the second gear 292 is rotatably connected to the first gear 291, and the third gear 293 is rotatably connected to the second gear 292. The rotation of the motor 21 can be transmitted to the sun gear 25 through multiple gears, thereby improving stability and controllability of rotation of the sun gear 25.

Optionally, referring to FIG. 6 to FIG. 7 again, in this implementation, the driving mechanism 20 further includes a worm wheel 294 and a worm 295. The worm 295 is connected to the motor 21, one end of the worm wheel 294 is rotatably connected to the worm 295, and the other end of the worm wheel 294 is rotatably connected to the gear assembly 29.

As mentioned above, the rotation of the motor 21 can be transmitted to the sun gear 25 through the gear assembly 29. In this implementation, both the worm wheel 294 and the worm 295 can also be additionally disposed between the motor 21 and the gear assembly 29. The worm 295 is connected to the motor 21, one end of the worm wheel 294 is rotatably connected to the worm 295, and the other end of the worm wheel 294 is rotatably connected to the gear assembly 29. The rotation of the motor 21 is transmitted to the ring gear 23 by cooperation of the worm wheel 294 and the worm 295, and a single-stage speed ratio of the worm wheel 294 to the worm 295 is relatively large, and noise and vibration are relatively little during rotation. The worm wheel 294 has a self-locking function with the worm 295. The self-locking function may be understood as that the worm 295 can be linked with the worm wheel 294 to rotate when the worm 295 rotates, but the locking worm wheel 294 is locked and immovable when the worm 295 does not move. In addition, since a rotation direction of the worm 295 is perpendicular to a rotation direction of the worm wheel 294, an arrangement direction of the motor 21 can be changed, thereby simplifying the structure of the driving mechanism 20 and reducing the overall size of the electric lock body 21.

Optionally, referring to FIG. 5 again, the driving mechanism 20 can further include a protective case 27 for protecting some structural components of the driving mechanism 20, such as the worm wheel 294, the worm 295, the planetary gear assembly 22, and the gear assembly 29.

To sum up, in the electric block body 1 provided in the present disclosure, firstly, the planetary gear assembly 22 is disposed, such that the motor 21 is rotatably connected to the sun gear 25, that is, the motor 21 can control the rotation of the sun gear 25. Secondly, the planet gear 24 is connected to the cage 26, that is, the planet gear 24 can control the rotation of the cage 26. Thirdly, the bolt 30 is connected to the cage 26, that is, the cage 26 can control the movement of the bolt 30. In addition, in the present disclosure, the planet gear 24 can be rotated by mutual cooperation of the ring gear 23, the planet gear 24, and the sun gear 25, then the cage 26 is driven to rotate, and finally the bolt 30 connected to the cage 26 is driven to move, such that the bolt 30 switches between the unlocked state where the bolt 30 is accommodated in the housing 10 and the locked state where the bolt 30 extends beyond the housing 10. Moreover, the door can be opened or closed by adopting the motor 21 to control the sun gear 25 to rotate or by controlling the ring gear 23 to rotate, such that a method for controlling the door lock is added, a problem that the door is unable to be opened or closed due to motor 21 damage in a single motor lock is avoided, and a difficulty and a risk of opening the door is reduced.

Referring to FIG. 3 to FIG. 4 again, in this implementation, the electric lock body 1 further includes a transmission mechanism 40. The transmission mechanism 40 has one end connected to the cage 26, and the other end connected to the bolt 30. When the cage 26 rotates, the bolt 30 is driven by the cage 26 through the transmission mechanism 40 to move.

As mentioned above, a final result of movement of the driving mechanism 20 is rotation of the planet gear 24, such that the cage 26 connected to the planet gear 24 is driven to rotate, and then the bolt 30 connected to the cage 26 is driven to move. In this implementation, the electric lock body 1 further includes the transmission mechanism 40, one end of the transmission mechanism 40 is connected to the cage 26, and the other end of the transmission mechanism 40 is connected to the bolt 30, such that the cage 26 is indirectly connected to the bolt 30 through the transmission mechanism 40. When the cage 26 rotates, the cage 26 can drive the transmission mechanism 40 to move, and then movement of the transmission mechanism 40 drives the bolt 30 to move, such that the bolt 30 can extend beyond the housing 10 or be accommodated in the housing 10.

Figure 8:
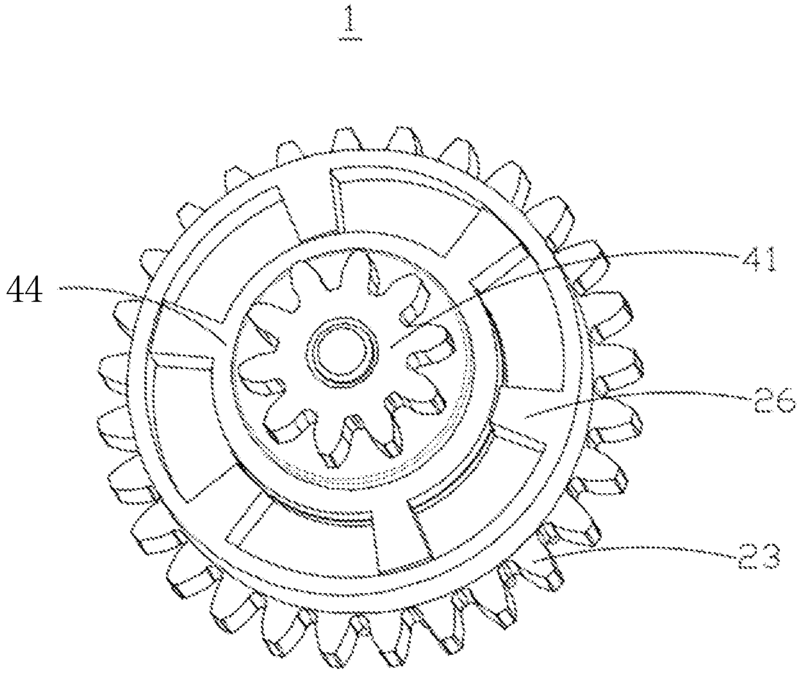
FIG. 8 is a schematic perspective structural view of part of a driving mechanism and part of a transmission mechanism in an implementation of the present disclosure.

Referring to FIG. 3, FIG. 4, and FIG. 8 together, FIG. 8 is a schematic perspective structural view of part of the driving mechanism 20 and part of the transmission mechanism 40 in an implementation of the present disclosure. In this implementation, the transmission mechanism 40 includes an output gear 41, a rack 42, and a bolt plate 43. The output gear 41 is connected to the cage 26. The output gear 41 engages with the rack 42. The rack 42 is connected to the bolt plate 43. The bolt plate 43 is connected to the bolt 30.

A specific structure of the transmission mechanism 40 is further provided in this implementation. The transmission mechanism 40 includes the output gear 41, the rack 42, and the bolt plate 43. The output gear 41 is connected to the cage 26, the output gear engages with the rack 42, and the rack 42 is connected to the bolt plate 43, and finally the rack 30 is connected to the rack 30 through the bolt plate 43. In this way, when the cage 26 rotates, the cage 26 can drive the output gear 41 to rotate, and then the rack 42 is driven to move, such that rotation can be converted into linear movement. Movement of the rack 42 can drive the bolt plate 43 to move, and finally the bolt 30 is driven to move. With the aid of the transmission mechanism 40, the bolt 30 is driven to move, such that stability and adjustability of the movement of the bolt 30 can be improved.

Figure 9:
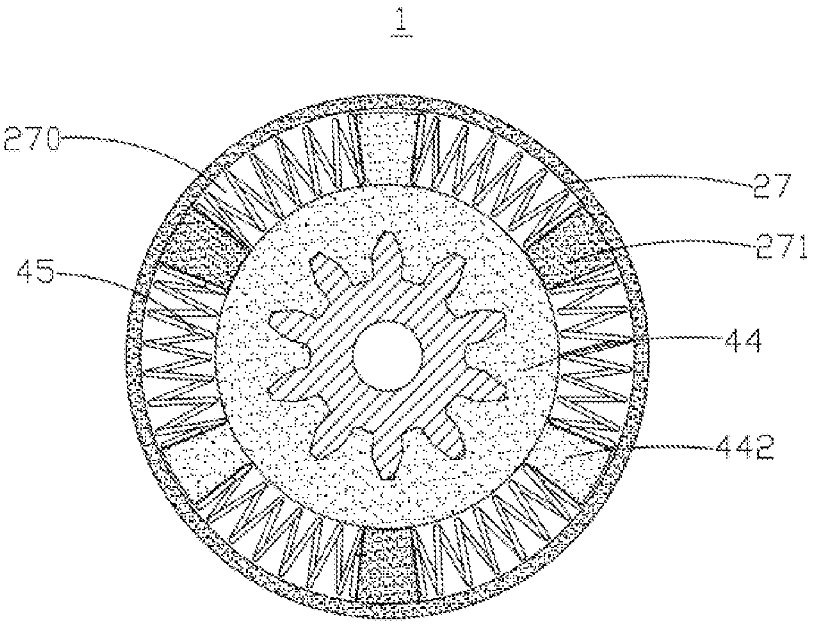
FIG. 9 is a top view of part of a driving mechanism and part of a transmission mechanism in an implementation of the present disclosure.

Referring to FIG. 3, FIG. 4, FIG. 8, and FIG. 9 together, FIG. 9 is a top view of part of the driving mechanism 20 and part of the transmission mechanism 40 in an implementation of the present disclosure. In this implementation, the planet gear 24 is connected to the cage 26 at one side of the cage 26, and the cage 26 defines a buffer groove 270 at the other side of the cage 26, and first protrusions 271 protrude from a sidewall of the buffer groove 270 defined in the cage 26.

The transmission mechanism 40 further includes a connecting member 44. The output gear 41 is disposed on the connecting member 44. The connecting member 44 is provided with second protrusions 442 at a periphery of the connecting member 44. At least part of each of the second protrusions 442 is disposed in the buffer groove 270. Each of the second protrusions 442 is provided between two adjacent first protrusions 271.

The electric lock body 1 further includes buffer members 45. The buffer members 45 are disposed in the buffer groove 270. The buffer members 45 each abut between one first protrusion 271 and one second protrusion 442 adjacent to the first protrusion 271.

In this implementation, firstly, the output gear 41 is not rigidly connected to the cage 26, but is flexibly connected to the cage 26. Secondly, the output gear 41 is not directly connected to the cage 26. Specifically, the transmission mechanism 40 further includes the connecting member 44. The output gear 41 is disposed on the connecting member 44, and the connecting member 44 is flexibly connected to the cage 26, such that the output gear 41 is indirectly connected to the cage 26. In addition, the planet gear 24 is connected to the cage 26 at one side of the cage 26, and the output gear 41 and the connecting member 44 are connected to the cage 26 at the other side of the cage 26, such that the structure of the transmission mechanism 40 is simplified.

In addition, the buffer groove 270 is defined at the other side of the cage 26. Multiple first protrusions 271 protrude from the sidewall of the buffer groove 270 and are spaced apart from one another. At least part of the connecting member 44 and at least part of each of the buffer members 45 are accommodated in the buffer groove 270. The connecting member 44 is configured to be connected to the output gear 41, the connecting member 44 is further provided with multiple second protrusions 442 at an outer peripheral sidewall of the connecting member 44, the multiple second protrusions 442 are spaced apart from one another, and each of the multiple second protrusions 442 is disposed between two adjacent first protrusions 271. It may also be understood that the second protrusion 442 and the first protrusion 271 are arranged in a staggered manner. One buffer member 45 may be disposed between one first protrusion 271 and one second protrusion 442 adjacent to the first protrusion 271, that is, the buffer member 45 is connected to the first protrusion 271 and the second protrusion 442 at two opposite ends of the buffer member 45, respectively. Optionally, the buffer member 45 is an elastic structural component. Optionally, the buffer member 45 may be a spring, an elastic foam, or the like.

Firstly, in this implementation, the first protrusion 271 may be connected to the second protrusion 442 through the buffer member 45, such that the cage 26 is connected to the connecting member 44, and then the cage 26 is connected to the transmission mechanism 40. Therefore, when the cage 26 rotates, the transmission mechanism 40 may be driven to move, and then the bolt plate 43 may be driven to move. Secondly, since the buffer member 45 has a buffer performance, the cage 26 can be flexibly connected to the transmission mechanism 40 through the buffer member 45. For example, when the output gear 41 and the rack 42 are stuck during transmission, the buffer member 45 can be elastically compressed and absorb a stress through a reaction force. When the output gear 41 rotates in a reverse direction, the buffer member 45 can release a compressive stress to push the output gear 41 to rotate in the reverse direction. In this way, not only can the buffer member 45 be utilized to absorb an excess stress, but also the output gear 41 can be pushed to rotate through the stress when rotating in the reverse direction. Therefore, not only can a stuck phenomenon in transmission of the output gear 41 be effectively prevented, but also the force required for reverse movement can be effectively reduced.

Figure 10:
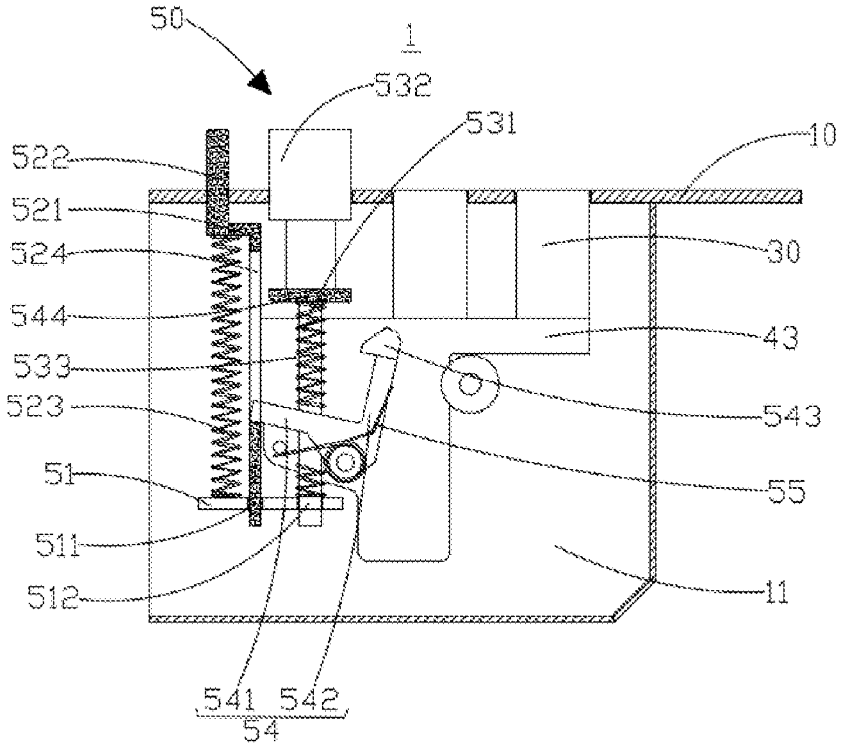
FIG. 10 is a partial structural schematic view of an electric lock body in a positioned state in an implementation of the present disclosure.
Figure 11:
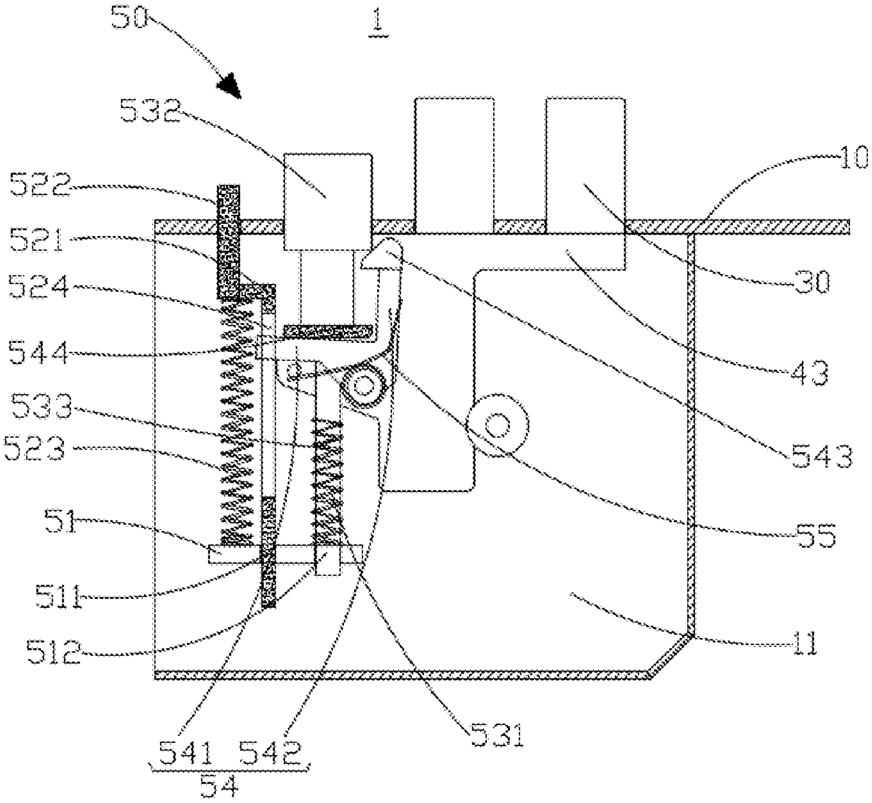
FIG. 11 is a partial schematic structural view of an electric lock body in a locked state in an implementation of the present disclosure.
Figure 12:
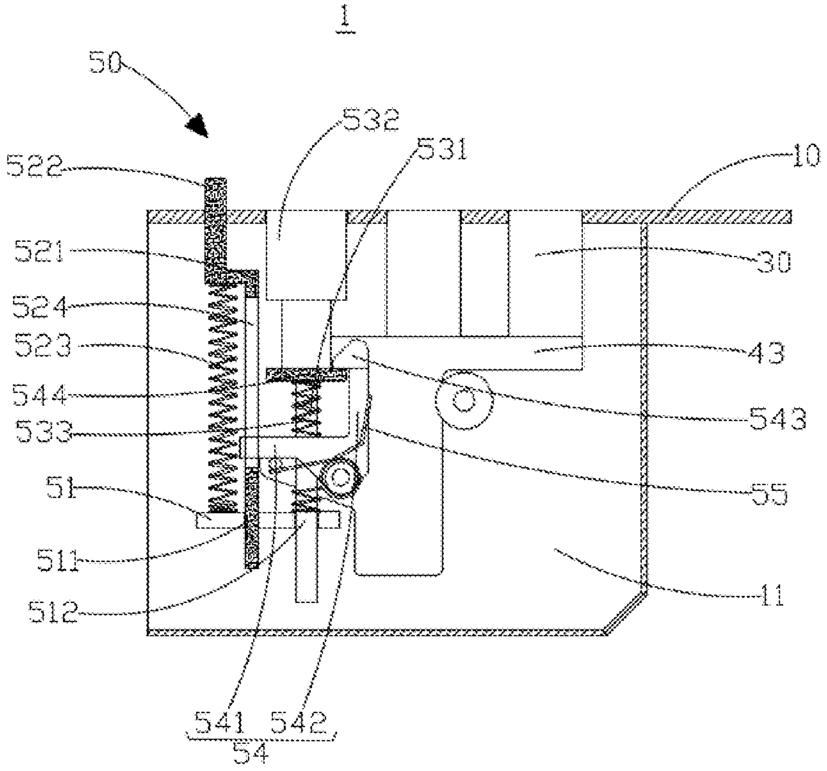
FIG. 12 is a partial schematic structural view of an electric lock body in an unlock state in an implementation of the present disclosure.

Referring to FIG. 3 to FIG. 4, and FIG. 10 to FIG. 12 together, FIG. 10 is a partial schematic structural view of the electric block body 1 in a positioned state in an implementation of the present disclosure, FIG. 11 is a partial schematic structural view of the electric lock body 1 in a lock state in an implementation of the present invention, and FIG. 12 is a partial schematic structural view of the electric lock body 1 in an unlock state in an implementation of the present disclosure. In this implementation, the electric lock body 1 further includes a positioning mechanism 50. At least part of the positioning mechanism 50 is disposed in the accommodating space. The positioning mechanism 50 is connected to the bolt plate 43. The positioning mechanism 50 is driven to move when the bolt plate 43 moves. The electric lock body 1 further has a positioned state. When the electric lock body 1 is in the positioned state and the locked state, part of the positioning mechanism 50 extends beyond the housing 10. When the electric lock body 1 is in the unlocked state, the positioning mechanism 50 is accommodated in the accommodating space 11.

In this implementation, the electric lock body 1 further includes the positioning mechanism 50, at least part of the positioning mechanism 50 is disposed in the accommodating space, and the positioning mechanism 50 is connected to the bolt plate 43. The positioning mechanism 50 can also be driven by the bolt plate 43 to extend beyond the housing 10 or be accommodated in the housing 10. Under mutual cooperation of the positioning mechanism 50 and the bolt 30, the electric lock body 1 can have various states. In other words, in addition to the above locked state and the above unlock state of the electric lock body 1, the electric lock body 1 further has the positioned state. When the electric lock body 1 is in the positioned state and the locking state, part of the positioning structure extends beyond the housing 10. When the electric lock body 1 is in the unlocking state, the positioning mechanism 50 is accommodated in the accommodating space 11.

It may also be understood that when the electric lock body 1 is in the positioned state, as illustrated in FIG. 4 and FIG. 10, the bolt 30 is accommodated in the housing 10, and part of the positioning mechanism 50 extends beyond the housing 10. When the electric lock body 1 is in the locked state, as illustrated in FIG. 3 and FIG. 11, the bolt 30 and part of the positioning mechanism 50 each extend beyond the housing 10. When the electric lock body 1 is in the unlocked state, as illustrated in FIG. 12, the bolt 30 and part of the positioning mechanism 50 each are accommodated in the housing 10. With the aid of the positioning mechanism 50, the electric lock body 1 can position before locking. When the door is closed and before locking, part of the positioning mechanism 50 extending beyond the housing 10 may enter the lock hole to position. In addition, with the aid of the positioning mechanism 50, the door can be opened or closed in the unlocked state.

Referring to FIG. 10 to FIG. 12 together, a specific structure of the positioning mechanism 50 is further provided in this implementation. The positioning mechanism 50 includes a fixing member 51, a first connecting rod 521, a push rod 522, a first elastic member 523, a second connecting rod 531, a latch bolt 532, a second elastic member 533, and a latch-bolt hook 54. The fixing member 51 is connected to the housing 10. The positioning member 51 defines a first through-hole 511 and a second through-hole 512 that is spaced apart from the first through-hole 511. The first connecting rod 521 has one end penetrating through the first through-hole 511, and another end connected to the push rod 522. The first connecting rod 521 defines a third through-hole 524. At least part of the push rod 522 is disposed in the accommodating space 11. The first elastic member 523 is connected to the push rod 522 and the fixing member 51. The second connecting rod 531 has one end penetrating through the second through-hole 512, and another end connected to the latch bolt 532. At least part of the latch bolt 532 is disposed in the accommodating space 11. The second elastic member 533 is connected to the latch bolt 532 and the fixing member 51. The latch-bolt hook 54 is rotatably connected to the bolt plate 43. The latch-bolt hook 54 has a first part 541 and a second part 542 connected to the first part 541. The first part 541 is disposed in the third through-hole 524. The first part 541 is configured to cooperate with the first connecting rod 521 to control the push rod 522 to move. The second part 542 is provided with a first positioning portion 543 at one end of the second part 542 close to the latch bolt 532. The latch bolt 532 is provided with a second positioning portion 544 at an outer peripheral sidewall of the latch bolt 532 close to the second connecting rod 531. The first positioning portion 543 is configured to cooperate with the second positioning portion 544 to control the latch bolt 532 to move.

A specific structure of the positioning mechanism 50 is further provided in this implementation. The positioning mechanism 50 can extend beyond or be accommodated in the housing 10 mainly by mutual cooperation of the push rod 522, the latch bolt 532, and the latch-bolt hook 54.

The fixing member 51 is mainly configured to fix some structural components of the positioning mechanism 50, and the fixing member 51 defines the first through-hole 511 and the second through-hole 512 that is spaced apart from the first through-hole 511. The first connecting rod 521, the push rod 522, and the first elastic member 523 are a set of components of the positioning mechanism 50. One end of the first connecting rod 521 penetrates through the first through-hole 511, the other end of the first connecting rod 521 is connected to the push rod 522, and at least part of the push rod 522 is disposed in the accommodating space 11. In this way, the first connecting rod 521 is able to move in the first through-hole 511 to drive the push rod 522 to move. In addition, the first elastic member 523 is connected to the push rod 522 and the first connecting member 51, such that when the first connecting rod 521 moves, the first elastic member 523 can have a compressed state and a stretched state. Moreover, the first connecting rod 521 defines the third through-hole 524. The third through-hole 524 is used to cooperate with the latch-bolt hook 54 subsequently.

The second connecting rod 531, the latch bolt 532, and the second elastic member 533 are another set of components of the positioning mechanism 50. Like the first set of components, one end of the second connecting rod 531 penetrates through the second through-hole 512, the other end of the second connecting rod 531 is connected to the latch bolt 532, and at least part of the latch bolt 532 is disposed in the accommodating space 11. In this way, the second connecting rod 531 can move in the second through-hole 512 to drive the latch bolt 532 to move. In addition, the second elastic member 533 is connected to the push rod 522 and the fixing member 51. In this way, when the second connecting rod 531 moves, the second elastic member 533 can have a compressed state and a stretched state.

The latch-bolt hood 54 is rotatably connected to the bolt plate 43. The latch-bolt hood 54 includes the first part 541 and the second part 542 connected to the first part 541. The push rod 522 is controlled to move by mutual cooperation of the first part 541 and the first connecting rod 521. Then the latch bolt 532 is controlled to move by mutual cooperation of the first positioning portion 543 and the second positioning portion 544. The latch-bolt hook 54 is a component that is connected to the push rod 522 and the latch bolt 532, and when one of the push rod 522 and the latch bolt 532 moves, the other of the push rod 522 and the latch bolt 532 can also move through the latch-bolt hook 54.

In addition, referring to FIG. 10 to FIG. 12 together, in this implementation, the positioning mechanism 50 further includes a third elastic member 55. The third elastic member 55 is connected to the bolt plate 43 and the latch-bolt hook 54.

In this implementation, the third elastic member 55 may be additionally disposed, and the third elastic member 55 is connected to the bolt plate 43 and the latch-bolt hook 54. When one of the push rod 522 and the latch bolt 532 moves, the latch-bolt hook 54 rotates and drives the other of the push rod 522 and the latch bolt 532 to move together. Here, the third elastic member 55 is deformed, and the latch-bolt hook 54 has a capability of restoring an initial state, thereby facilitating repeated movement of the latch-bolt hook 54.

A detailed process of movement of the positioning mechanism 50 is further introduced in this implementation. When the electric lock body 1 switches from the positioned state to the locking state, as illustrated in a process in FIG. 10 to FIG. 11, part of the push rod 522 and part of the latch bolt 532 each extend beyond the housing 10, that is, after a user utilizes the positioning mechanism 50 to position before locking, the driving mechanism 20 drives the bolt plate 43 to drive the bolt 30 to move, such that part of the bolt 30 extends beyond the housing 10.

When the electric lock body 1 switches from the locked state to the unlocked state, that is, when the user needs to open the door, as illustrated in a process in FIG. 11 to FIG. 12, the drive mechanism 20 drives the bolt plate 43 to drive the bolt 30 to move, to make the bolt 30 be accommodated in the accommodating space 11. During movement of the bolt plate 43, the second positioning portion 544 can abut against the first positioning portion 543 and drive the latch bolt 532 to move, to make the latch bolt 532 be accommodated in the accommodating space 11 and the second elastic member 533 be in a compressed state. During the movement of the bolt plate 43, the first part 541 can abut against the first connecting rod 521 at a sidewall of the third through-hole 524 defined in the first connecting rod 521 and drive the push rod 522 to move, to make the push rod 522 be accommodated in the accommodating space 11 and the first elastic member 523 be in the compressed state. Here, the first elastic member 523 and the second elastic member 533 each are in the compressed state.

When the electric lock body 1 switches from the unlocked state to the positioned state, that is, after the user open the door, as illustrated in a process in FIG. 12 to FIG. 10, the push rod 522 and the first connecting rod 521 are driven by the first elastic member 523 to move, to make part of the push rod 522 extend beyond the housing 10. During movement of the first connecting rod 521, the first connecting rod 521 can abut against the first part 541 at the sidewall of the third through-hole 524 defined in the first connecting rod 521, and drive the latch-bolt hook 54 to rotate relative to the bolt plate 43, to make the first positioning portion 543 be separated from the second positioning portion 544, make the latch bolt 532 and the second connecting rod 531 be driven by the second elastic member 533 to move, and further make part of the latch bolt 532 extend beyond the housing 10.

In summary, when the electric lock body 1 is unlocked, the bolt plate 43 is linked with the latch-bolt hook 54 to drive the latch bolt 532 to be accommodated in the accommodating space 11. After the door is opened, the push rod 522 is ejected outwards under the action of the first elastic member 523, and during an ejection process, the push rod 522 is linked with the latch-bolt hook 54 to rotate to release the latch bolt 532 to eject and reset. By mutual cooperation of the various components mentioned above, various problems existing in a lockset in the related art are solved. For example, if the door is not opened, the latch bolt 532 will not be ejected, such that a mis-locking problem is effectively overcome. In addition, the positioning mechanism 50 provided in this implementation is driven by elastic components (the first elastic member 523 and the second elastic member 533), and does not need to be driven by a motor, thereby reducing a failure rate of the electric lock body 1.

Figure 13:
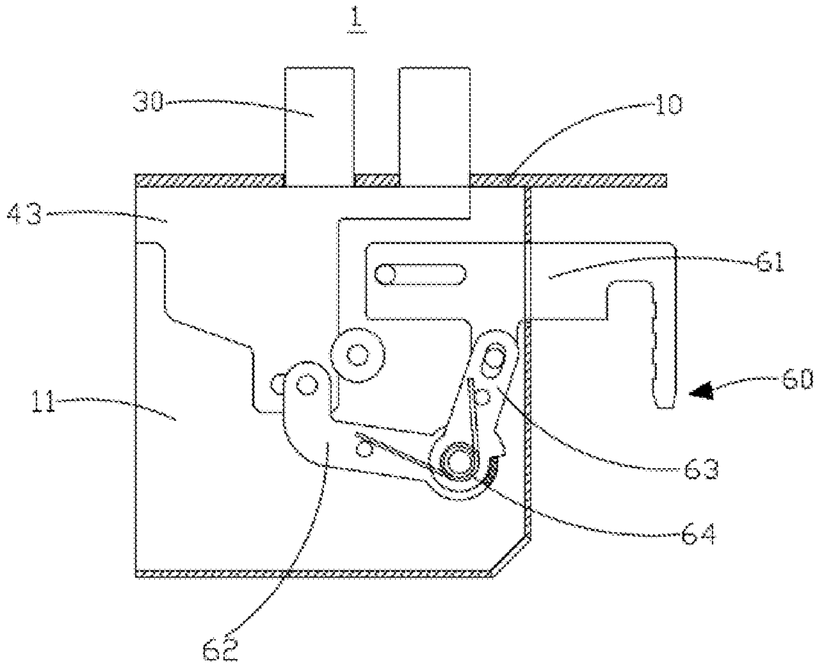
FIG. 13 is a partial schematic structural view of an electric lock body in a normal state in an implementation of the present disclosure.
Figure 14:
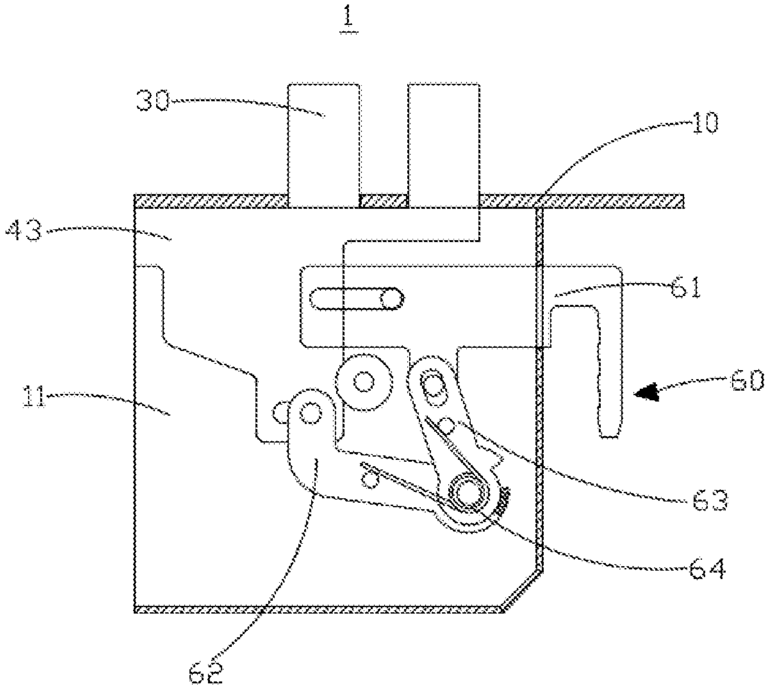
FIG. 14 is a partial structural schematic view of an electric lock body when a heaven-and-earth lock is stuck in an implementation of the present disclosure.

Referring to FIG. 13 to FIG. 14 together, FIG. 13 is a partial schematic structural view of the electric block body 1 in a normal state in an implementation of the present disclosure, and FIG. 14 is a partial schematic structural view of the electric lock body 1 when a heaven-and-earth lock 61 is stuck in an implementation of the present disclosure. In this implementation, the electric lock body 1 further includes a heaven-and-earth lock mechanism 60. At least part of the heaven-and-earth lock mechanism 60 is disposed in the accommodating space 11. The heaven-and-earth lock mechanism 60 includes a heaven-and-earth lock 61, a third part 62, a fourth part 63, and a fourth elastic member 64. The heaven-and-earth lock 61 is slidably connected to the housing 10. One end of the third portion 62 and one end of the fourth portion 63 each are rotatably connected to the housing 10. Another end of the third part 62 is slidably connected to the bolt plate 43. Another end of the fourth part 63 is slidably connected to the heaven-and-earth lock 61. The fourth elastic member 64 is connected to the third part 62 and the fourth part 63. In the present disclosure, the heaven-and-earth lock 61 may include hooks additionally disposed in the upper part of the electric lock body 1 and the lower part of the electric lock body 1 respectively. In the locked state, the hooks can extend beyond the housing 10 towards the upper side of the electric lock body 1 and towards the lower side of the electric lock body 1 respectively. In the unlock state, the hooks can be accommodated in the housing 10. The upper side and the lower side of the electric lock body 1 each are in a length direction of the electric lock body 1, that is, direction X.

In the electric lock body 1, in addition to locking and unlocking by the bolt 30, the heaven-and-earth lock mechanism 60 is additionally disposed in this implementation, the heaven-and-earth lock mechanism 60 may be understood as an auxiliary lock, and the heaven-and-earth lock mechanism 60 can also lock and unlock, such that security and anti-theft of the electric lock body 1 can be further improved. In the related art, the heaven-and-earth lock 61 is rigidly connected to the bolt 30, such that the movement of the bolt 30 can drive the heaven-and-earth lock 61 to move together. However, when the heaven-and-earth lock 61 is stuck, the heaven-and-earth lock 61 and the bolt 30 each are unable to unlock or lock effectively as normal.

Therefore, in this implementation, the heaven-and-earth lock mechanism 60 includes the heaven-and-earth lock 61, the third portion 62, the fourth portion 63, and the fourth elastic member 64. The third part 62 and the fourth part 63 may constitute a drive rocker arm. The third part 62 and the fourth part 63 each are rotatably connected to the housing 10, that is, the third part 62 and the fourth part 63 have split structures, and the third part 62 and the fourth part 63 each rotate independently. The other end of the third part 62 is slidably connected to the bolt plate 43, and the other end of the fourth part 63 is slidably connected to the heaven-and-earth lock 61, such that movement of the bolt plate 43 can drive the third part 62 to rotate, and movement of the heaven-and-earth lock 61 can also drive the fourth part 63 to rotate. In addition, the fourth elastic member 64 is connected to the third part 62 and the fourth part 63. Therefore, the third part 62 can be connected to the fourth part 63 through the fourth elastic member 64, such that the bolt 30 can be flexibly connected to the heaven-and-earth lock 61.

In the normal state, for example, when locked, as illustrated in FIG. 13, during the bolt plate 43 driving the bolt 30 to extend beyond the housing 10, the bolt plate 43 will be linked with the third part 62 to rotate, and rotation of the third part 62 can be transmitted to the fourth part 63 through the fourth elastic member 64, such that the fourth part 63 also rotates, and then the heaven-and-earth lock 61 is driven to extend beyond the housing 10. However, once the electric lock body 1 is stuck during the transmission, for example, a structure of the heaven-and-earth lock 61 is stuck, as illustrated in FIG. 14, the bolt plate 43 is also able to drive the bolt 30 to extend beyond the housing 10, and be linked with the third part 62 to rotate. However, when the heaven-and-earth lock 61 is stuck, that is, the heaven-and-earth lock 61 is unable to move stably, it may also be understood that the fourth part 63 is unable to rotate stably. In this case, the fourth elastic member 64 can absorb a rotation force generated by the rotation of the third part 62, such that the bolt 30 moves normally, and a phenomenon that the bolt 30 is unable to lock the door normally due to the heaven-and-earth lock 61 being stuck is effectively prevented. When the bolt 30 is pulled back, the bolt 30 rigidly drives the heaven-and-earth lock 61 to move, such that normal operation of opening or closing the door can be effectively ensured by mutual cooperation of the above components.

Referring to FIG. 3 to FIG. 4 again, in this implementation, the electric lock body 1 further includes a guide mechanism 70 disposed in the accommodating space 11. The guide structure is rotatably connected to the housing 10. The guide mechanism 70 is configured to cooperate with the bolt plate 43 to make the bolt plate 43 move in a preset direction.

In this implementation, the guide mechanism 70 may further be additionally disposed. By mutual cooperation of the guide mechanism 70 and the bolt plate 43, the bolt plate 43 moves in the preset direction, and the bolt 30 can also move in the preset direction, such that the bolt 30 extends beyond the housing 10 and is accommodated in the housing 10 more stably. Optionally, the guide mechanism 70 includes, but is not limited to, a guide pulley. In the present disclosure, the preset direction may be a width direction of the electric lock body 1, that is, direction Y.

The above implementations in the present disclosure are described in detail. Principles and implementations of the present disclosure are elaborated herein. The above illustration is only used to help to understand methods and core ideas of the present disclosure. At the same time, for those of ordinary skill in the art, according to ideas of the present disclosure, there will be changes in specific implementations and application scope. In summary, contents of this specification should not be understood as limitation on the present disclosure.

What is claimed is:

1. An electric lock body, comprising:

a housing defining an accommodating space;

a driving mechanism disposed in the accommodating space, wherein the driving mechanism comprises a motor, a planetary gear assembly, and a cage; the planetary gear assembly comprises a ring gear, a planet gear, and a sun gear, and the motor is rotatably connected to the sun gear; the ring gear defines a receiving space, the planet gear and part of the sun gear each are disposed in the receiving space, and the planet gear is rotatably connected between the sun gear and the ring gear; and the cage is disposed at one side of the planetary gear assembly, the ring gear and the sun gear each abut against the cage, and the planet gear is connected to the cage; wherein when the ring gear is in a fixed state, the sun gear is driven by the motor to rotate, to make the planet gear rotate relative to the ring gear to make the cage rotate; or when the sun gear is in the fixed state, the ring gear is controlled to rotate to make the planet gear rotate relative to the sun gear to make the cage rotate;

a bolt, wherein at least part of the bolt is disposed in the accommodating space, the bolt is connected to the cage, and when the cage rotates, the bolt is driven by the cage to move, to make the bolt switch between an unlocked state where the bolt is accommodated in the housing and a locked state where the bolt extends beyond the housing; and a transmission mechanism, wherein the transmission mechanism has one end connected to the cage, and another end connected to the bolt; and when the cage rotates, the bolt is driven by the cage through the transmission mechanism to move;

wherein the transmission mechanism comprises an output gear, a rack, and a bolt plate, the output gear is connected to the cage, the output gear engages with the rack, the rack is connected to the bolt plate, and the bolt plate is connected to the bolt.

2. The electric lock body of claim 1, wherein the planet gear is connected to the cage at one side of the cage, the cage defines a buffer groove at another side of the cage, and first protrusions protrude from a sidewall of the buffer groove defined in the cage;

the transmission mechanism further comprises a connecting member, the output gear is disposed on the connecting member, the connecting member is provided with second protrusions at a periphery of the connecting member, at least part of each of the second protrusions is disposed in the buffer groove, and each of the second protrusions is disposed between two adjacent first protrusions; and the electric lock body further comprises buffer members, wherein the buffer members are disposed in the buffer groove, and the buffer members each abut between one first protrusion and one second protrusion adjacent to the first protrusion.

3. The electric lock body of claim 1, further comprising a positioning mechanism, wherein at least part of the positioning mechanism is disposed in the accommodating space, the positioning mechanism is connected to the bolt plate; the positioning mechanism is driven to move when the bolt plate moves; the electric lock body further has a positioned state; when the electric lock body is in the positioned state and the locked state, part of the positioning mechanism extends beyond the housing; and when the electric lock body is in the unlocked state, the positioning mechanism is accommodated in the accommodating space.

4. The electric lock body of claim 3, wherein the positioning mechanism comprises:

a fixing member connected to the housing, wherein the fixing member defines a first through-hole and a second through-hole that is spaced apart from the first through-hole;

a first connecting rod, a push rod, and a first elastic member, wherein the first connecting rod has one end penetrating through the first through-hole, and another end connected to the push rod, the first connecting rod defines a third through-hole, at least part of the push rod is disposed in the accommodating space, and the first elastic member is connected to the push rod and the fixing member;

a second connecting rod, a latch bolt, and a second elastic member, wherein the second connecting rod has one end penetrating through the second through-hole, and another end connected to the latch bolt, at least part of the latch bolt is disposed in the accommodating space, and the second elastic member is connected to the latch bolt and the fixing member; and a latch-bolt hook rotatably connected to the bolt plate, wherein the latch-bolt hook has a first part and a second part connected to the first part, the first part is disposed in the third through-hole, and the first part is configured to cooperate with the first connecting rod to control the push rod to move; and the second part is provided with a first positioning portion at one end of the second part close to the latch bolt, the latch bolt is provided with a second positioning portion at an outer peripheral sidewall of the latch bolt close to the second connecting rod, and the first positioning portion is configured to cooperate with the second positioning portion to control the latch bolt to move.

5. The electric lock body of claim 4, wherein the positioning mechanism further comprises a third elastic member, and the third elastic member is connected to the bolt plate and the latch-bolt hook.

6. The electric lock body of claim 4, wherein when the electric lock body switches from the positioned state to the locked state, part of the push rod and part of the latch bolt each extend beyond the housing, and the driving mechanism is configured to drive the bolt plate to drive the latch bolt to move to make part of the bolt extend beyond the housing;

when the electric lock body switches from the locked state to the unlocked state, the drive mechanism is configured to drive the bolt plate to drive the bolt to move, to make the bolt be accommodated in the accommodating space; during movement of the bolt plate, the first positioning portion abuts against the second positioning portion and drives the latch bolt to move, to make the latch bolt be accommodated in the accommodating space and the second elastic member be in a compressed state; and during the movement of the bolt plate, the first part abuts against the first connecting rod at a sidewall of the third through-hole defined in the first connecting rod and drives the push rod to move, to make the push rod be accommodated in the accommodating space and the first elastic member be in the compressed state; and when the electric lock body switches from the unlocked state to the positioned state, the push rod and the first connecting rod are driven by the first elastic member to move, to make part of the push rod extend beyond the housing, and during movement of the first connecting rod, the first connecting rod abuts against the first part at the sidewall of the third through-hole defined in the first connecting rod, and drives the latch-bolt hook to rotate relative to the bolt plate, to make the first positioning portion be separated from the second positioning portion, make the latch bolt and the second connecting rod be driven by the second elastic member to move, and further make part of the latch bolt extend beyond the housing.

7. The electric lock body of claim 1, further comprising a heaven-and-earth lock mechanism, at least part of the heaven-and-earth lock mechanism is disposed in the accommodating space, and the heaven-and-earth lock mechanism comprises a heaven-and-earth lock, a third part, a fourth part, and a fourth elastic member, the heaven-and-earth lock is slidably connected to the housing, one end of the third portion and one end of the fourth portion each are rotatably connected to the housing, another end of the third part is slidably connected to the bolt plate, and another end of the fourth part is slidably connected to the heaven-and-earth lock; and the fourth elastic member is connected to the third part and the fourth part.

8. The electric lock body of claim 1, further comprising a guide mechanism disposed in the accommodating space, the guide mechanism is rotatably connected to the housing, and the guide mechanism is configured to cooperate with the bolt plate to make the bolt plate move in a preset direction.

* * * * *